US011877644B2

(12) United States Patent
Altschuler

(10) Patent No.: US 11,877,644 B2
(45) **Date of Patent: *Jan. 23, 2024**

(54) BRUSH HOLDING AND STERILIZING DEVICE

(71) Applicant: Mark Altschuler, Flowery Branch, GA (US)

(72) Inventor: Mark Altschuler, Flowery Branch, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,855

(22) Filed: Jun. 21, 2021

(65) Prior Publication Data

US 2021/0321759 A1 Oct. 21, 2021

Related U.S. Application Data

(63) Continuation of application No. 16/851,496, filed on Apr. 17, 2020, now Pat. No. 11,039,681.

(51) Int. Cl.

| | |
|---|---|
| ***A46B 17/06*** | (2006.01) |
| ***B08B 1/00*** | (2006.01) |
| ***B08B 3/08*** | (2006.01) |
| *A46B 9/04* | (2006.01) |

(52) U.S. Cl.

CPC ............ *A46B 17/065* (2013.01); *B08B 1/001* (2013.01); *B08B 3/08* (2013.01); *A46B 9/04* (2013.01); *A46B 17/06* (2013.01); *A46B 2200/1066* (2013.01); *A46B 2200/202* (2013.01); *A46B 2200/205* (2013.01)

(58) Field of Classification Search

CPC ... A46B 17/065; A46B 9/04; A46B 2200/205; A46B 17/06; A46B 2200/202; A46B 2200/1066; B08B 1/001; B08B 3/08

See application file for complete search history.

(56) References Cited

U.S. PATENT DOCUMENTS

| | | | | |
|---|---|---|---|---|
| 3,135,987 A * | 6/1964 | Huch | A46B 15/00 | 15/268 |
| 4,759,383 A * | 7/1988 | Phillips | A46B 17/06 | 422/301 |
| 4,915,219 A * | 4/1990 | Ottimo | A01N 25/34 | 206/362.1 |
| 4,995,509 A * | 2/1991 | Kornfeind | A47K 1/09 | 206/362.1 |
| 5,086,916 A * | 2/1992 | Gray | A47K 1/09 | 206/362.1 |

(Continued)

*Primary Examiner* — Benjamin L Osterhout

(74) *Attorney, Agent, or Firm* — Morris, Manning & Martin, LLP; Daniel E. Sineway, Esq.

(57) ABSTRACT

In various embodiments, the device may be used to clean any brush. The brush bristles carry bacteria, food particles, dust, germs, and other similar residue in tightly packed spaces near where the bristles connect with the head of the brush. In multiple embodiments, the device is a container that is filled with cleaning solution (e.g., mouthwash, cleaning solution, alcohol, etc.), a lid that substantially closes the top opening of the container, and an agitator pad that has a plurality of individual prongs. In various embodiments, the lid mirrors the container shape so that the lid and the container can be operatively connected. In various embodiments, the lid has a cover, so that when the device is not being use, the cover may be put in a closed position so that the cover closes the opening in the lid.

20 Claims, 6 Drawing Sheets

(56) References Cited

U.S. PATENT DOCUMENTS

| | | | | | |
|---|---|---|---|---|---|
| 5,690,214 | A * | 11/1997 | Gaines | A47K 1/09 | 206/362.1 |
| 10,758,034 | B2 * | 9/2020 | Fowler | A46B 9/005 | |
| 10,888,156 | B2 * | 1/2021 | Munoz | F26B 9/003 | |
| 11,039,681 | B1 * | 6/2021 | Altschuler | B08B 1/001 | |
| 2002/0050280 | A1 * | 5/2002 | Brackett | B44D 3/006 | 134/6 |
| 2004/0126274 | A1 * | 7/2004 | Song | A61L 2/07 | 422/26 |
| 2004/0129580 | A1 * | 7/2004 | Cochran | A47K 1/09 | 206/361 |
| 2004/0211683 | A1 * | 10/2004 | Barham | A46B 17/06 | 206/362.2 |
| 2007/0187271 | A1 * | 8/2007 | Shaw | A61L 2/18 | 206/362.2 |
| 2009/0321284 | A1 * | 12/2009 | Miller | A46B 17/06 | 206/209 |
| 2012/0067369 | A1 * | 3/2012 | Currell | B08B 3/006 | 15/21.1 |
| 2015/0013726 | A1 * | 1/2015 | Webster | A46B 17/06 | 15/257.01 |
| 2017/0007014 | A1 * | 1/2017 | Albers | B44D 3/125 | |
| 2017/0119145 | A1 * | 5/2017 | Munoz | F26B 25/22 | |
| 2017/0225349 | A1 * | 8/2017 | McDonald | B08B 3/10 | |
| 2017/0303745 | A1 * | 10/2017 | Ameti | A61L 2/26 | |
| 2018/0249817 | A1 * | 9/2018 | Cannon | B08B 1/00 | |
| 2018/0249818 | A1 * | 9/2018 | Cannon | A46B 17/06 | |
| 2019/0274421 | A1 * | 9/2019 | Cosolito | A46B 17/065 | |

* cited by examiner

BRUSH HOLDING AND STERILIZING DEVICE

CROSS-REFERENCE TO RELATED APPLICATIONS

This application is a continuation of, and claims priority to, U.S. patent application Ser. No. 16/851,496, filed Apr. 17, 2020, and entitled "BRUSH HOLDING AND STERILIZING DEVICE," the disclosure of which is hereby incorporated by reference herein in its entirety.

TECHNICAL FIELD

The present disclosure relates generally to a device for cleaning brushes and, more particularly, to a device for cleaning/sterilizing the bristles and head of a brush, such as a toothbrush.

BACKGROUND

Brushes are commonly used in everyday life to brush a variety of surfaces and substances. Common types of brushes include hair brushes, tooth brushes, paint brushes, and makeup brushes. Inevitably, while using the brush, the bristles come into contact with a variety of bacteria, dirt, dust, germs, and other substances that a user of the brush would want to remove from the bristles of the brush.

For example, human mouths host a variety of bacteria, which can cause a range of oral health problems. One of the most common oral health problems is tooth decay, which is caused by the acidic by-products of bacteria from feeding on food and plaque particles in a mouth. According to the American Dental Association, daily brushing is the best way to keep your mouth healthy and is an important part of your dental care. Brushing removes food particles, plaque, and stains from your teeth, and also helps treat bad breath.

Important to the toothbrush's ability to keep your mouth clean is that the toothbrush bristles are clean. Bathrooms, where most people store their toothbrushes, contain some of the highest concentrations of germs and bacteria in homes. The most common way people attempt to clean their toothbrushes after brushing their teeth is to run the bristles under tap water to rinse the toothpaste from the bristles. However, this does not remove bacteria or plaque and food residue found under the bristle surface. Other toothbrush sanitizing systems, such as ultra violet and sonic cleaning systems, only concentrate on killing the bacteria and germs but do not remove the food and plaque particles trapped in the toothbrush bristles, which allows the bacteria to propogate.

Therefore, there is a long-felt but unresolved need for a device that removes deeply trapped bacteria, germs, dirt, dust, and other similar substances from the bristles of a brush.

BRIEF SUMMARY OF THE DISCLOSURE

Briefly described, and according to one embodiment, aspects of the present disclosure generally relate to a device for holding and sterilizing a brush.

In various embodiments, the device may be used to clean a brush that has bristles. In some in embodiments, the bristles may be perpendicular to the brush head, or the bristles may extend in a parallel plane from the brush head. The bristles may be densely packed onto the brush head (e.g., a horse brush) or the bristles may be sparsely placed on the brush head (e.g., a hair brush).

In an exemplary embodiment, the device may be used to clean any toothbrush. The toothbrush bristles carry bacteria, food particles, plaque residue, and other germs in tightly packed spaces near where the bristles connect with the head of the toothbrush. In multiple embodiments, the device is a container that is filled with cleaning solution (e.g., mouthwash, sterilizing solution, alcohol, etc.), a lid that substantially closes the top opening of the container, and an agitator pad that has a plurality of individual prongs. Generally, the container may be any shape that can accommodate the agitator pad. In at least one embodiment, the container may be arcuate, with the ends of the arc connecting in a straight line, cylindrical, or rectangular prism. In various embodiments, the lid mirrors the container shape so that the lid and the container can be operatively connected. In various embodiments, the lid has a cover, so that when the device is not being use, the cover may be put in a closed position so that the cover closes the opening in the lid. Additionally, in further embodiments, the bottom of the container may have non-slip pads or other functional attachments so that when the device in on a surface, such as a bathroom counter, it cannot easily be moved.

In various embodiments, the device may have more than one compartment, such that the device can hold two or more toothbrushes. In multiple embodiments, when the device comprises two or more compartments, the compartments are fully separated from the other compartments, such that cleaning solution from one compartment cannot flow into another compartment. Additionally, in various embodiments, when the device comprises two or more separate compartments, each compartment has a separate opening in the lid of the device, such that if a device has four compartments, the lid may have four openings in the lid, each opening above one separate compartment.

In multiple embodiments, device includes an agitator pad having a plurality of individual prongs on the agitator pad that may be connected to the front side of the agitator pad, while the back side of the agitator pad is connected to the interior of the wall of the device container. Generally, the plurality of individual prongs of the agitator pad, in various embodiments, may be any shape and make any pattern or not have any pattern. In some embodiments, the plurality of individual prongs of the agitator pad may all be the same size. In an alternative embodiment, the plurality of individual prongs of the agitator pad may be two or more different sizes. Generally, the agitator pad may be any shape, but, preferably, generally the shape of the brush head to be cleaned. In various embodiments, the agitator pad is wider than the width of a typical toothbrush and taller than the height of a typical toothbrush head.

To use aspects of the present device, a user, in various embodiments, inserts a toothbrush head through an opening of the lid into the container filled with cleaning solution and rubs the bristles of the toothbrush against the individual prongs of the agitator pad to dislodge any deep-seated food particles, plaque residue, bacteria and/or other germs. The cleaning solution, in some embodiments, kills the bacteria and germs that become dislodged from the bristles. In at least one embodiment, the opening in the lid has apertures over the opening, substantially closing the opening, so that when the user is rubbing the bristles against the agitator pad, the cleaning solution cannot splash out of the container. In various embodiments, once the user is finished rubbing the bristles over the agitator pad, the user may leave the toothbrush head inside the device container filled with cleaning solution, so that no other germs may grow on any part of the toothbrush bristles or head. In some embodiments, the user may periodically drain the cleaning solution from the device container by removing the lid from the container and pouring the cleaning solution out. The user may then refill the container with new cleaning solution.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

According to a first aspect, a device for cleaning a brush, including: A) a container for receiving a head of the brush, including: 1) a bottom; and 2) at least one sidewall, wherein an upper portion of the at least one sidewall defines an opening; and B) an agitator pad affixed to an interior portion of the at least one sidewall of the container, wherein the agitator pad includes a plurality of individual prongs, wherein the plurality of individual prongs extend inwardly from the agitator pad into the container.

According to a second aspect, the device of the first aspect or any other aspect, further including a lid releasably affixed to the opening, defining a lid opening in the lid.

According to a third aspect, the device of the second aspect or any other aspect, further including a splashguard that substantially covers the lid opening.

According to a fourth aspect, the device of the third aspect or any other aspect, wherein the splashguard includes a plurality of apertures, the plurality of apertures comprising flexible portions.

According to a fifth aspect, the device of the third aspect or any other aspect, wherein the splashguard is operative connected to the lid by a spring-loaded hinge.

According to a sixth aspect, the device of the first aspect or any other aspect, further including at least one nonslip base affixed to an exterior portion of the bottom of the container.

According to a seventh aspect, the device of the sixth aspect or any other aspect, wherein the at least one nonslip base is made of at least one of the following: rubber, cork, wood, felt, magnetized metal, suction cup.

According to an eighth aspect, the device of the first aspect or any other aspect, wherein the container is configured to be filled with sterilizing solution.

According to a ninth aspect, the device of the first aspect or any other aspect, wherein the plurality of individual prongs include at least one of the following shapes: cone, cylinder, rectangular prism.

According to a tenth aspect, the device of the ninth aspect or any other aspect, wherein the plurality of individual prongs include at least two different sized prongs.

According to an eleventh aspect, the device of the first aspect or any other aspect, wherein the plurality of individual prongs are ordered in a pattern.

According to a twelfth aspect, the device of the first aspect or any other aspect, wherein the bottom includes one of the following shapes with at least one sidewall extending upwards: a circle, an oval, a square, a rectangle, a parabolic segment.

According to a thirteenth aspect, a device for cleaning a brush, including: A) a container for receiving a head of the brush, including: 1) a bottom; 2) at least one sidewall, wherein an upper portion of the at least one sidewall defines an opening; and 3) at least one dividing wall affixed to an interior portion of the at least one sidewall and bottom, wherein the at least one dividing wall defines at least two individual compartments; and B) at least two agitator pads, wherein a first agitator pad is affixed to an interior portion of the at least one sidewall of a first individual compartment and a second agitator pad is affixed to an interior portion of the at least one sidewall of a second individual compartment, wherein each of the at least two agitator pads include a plurality of individual prongs, wherein the plurality of individual prongs extend inwardly from each of the at least two agitator pads into the container.

According to a fourteenth aspect, the device of the thirteenth aspect or any other aspect, further including a lid releasably affixed to the opening, defining at least two lid openings in the lid, wherein a first lid opening corresponds to a first individual compartment and a second lid opening corresponds to a second individual compartment.

According to a fifteenth aspect, the device of the fourteenth aspect or any other aspect, further including at least two splashguards that substantially cover the at least two lid openings.

According to a sixteenth aspect, the device of the fifteenth aspect or any other aspect, wherein the at least two splashguards include a plurality of apertures, the plurality of apertures comprising flexible portions.

According to a seventeenth aspect, the device of the fifteenth aspect or any other aspect, wherein each of the at least two splashguards are operatively connected to the lid by spring-loaded hinges.

According to an eighteenth aspect, the device of the thirteenth aspect or any other aspect, further including at least one nonslip base affixed to an exterior portion of the bottom of the container.

According to a nineteenth aspect, the device of the eighteenth aspect or any other aspect, wherein the at least one nonslip base is made of at least one of the following: rubber, cork, wood, felt, magnetized metal, suction cup.

According to a twentieth aspect, the device of the thirteenth aspect or any other aspect, wherein each of the at least two individual compartments are able to be filled with cleaning solution.

According to a twenty-first aspect, the device of the thirteenth aspect or any other aspect, wherein the plurality of individual prongs include at least one of the following shapes: cone, cylinder, rectangular prism.

According to a twenty-second aspect, the device of the twenty-first aspect or any other aspect, wherein the plurality of individual prongs include at least two different sized prongs.

According to a twenty-third aspect, the device of the thirteenth aspect or any other aspect, wherein the plurality of individual prongs are ordered in a pattern.

According to a twenty-fourth aspect, the device of the thirteenth aspect or any other aspect, wherein the bottom includes one of the following shapes with at least one sidewall extending upwards therefrom: a circle, an oval, a square, a parabolic segment.

According to a twenty-fifth aspect, a device for cleaning a brush, including: A) a container for receiving a head of the brush, including: 1) a bottom; and 2) at least one sidewall, wherein an upper portion of the at least one sidewall defines an opening; and B) an agitator pad affixed to an interior portion of the bottom of the container, wherein the agitator pad includes a plurality of individual prongs, wherein the plurality of individual prongs extend inwardly from the agitator pad into the container.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
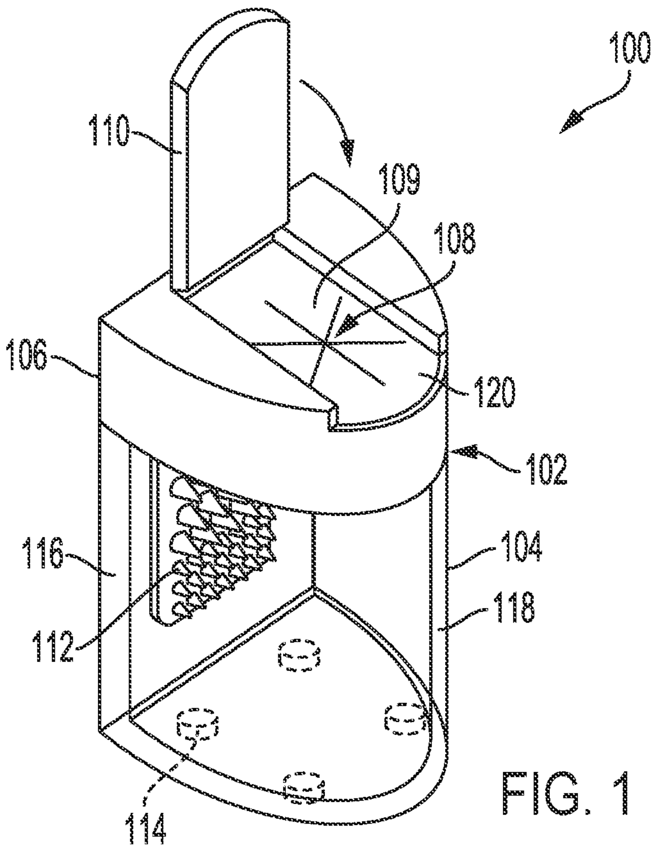
FIG. 1 is a perspective view of an exemplary toothbrush cleaning device, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to a device for holding and sterilizing a brush.

In various embodiments, the device may be used to clean a brush that has bristles. In some in embodiments, the bristles may be perpendicular to the brush head, or the bristles may extend in a parallel plane from the brush head. The bristles may be densely packed onto the brush head (e.g., a horse brush) or the bristles may be sparsely placed on the brush head (e.g., a hair brush).

In an exemplary embodiment, the device may be used to clean any toothbrush. The toothbrush bristles carry bacteria, food particles, plaque residue, and other germs in tightly packed spaces near where the bristles connect with the head of the toothbrush. In multiple embodiments, the device is a container that is filled with cleaning solution (e.g., mouthwash, sterilizing solution, alcohol, etc.), a lid that substantially closes the top opening of the container, and an agitator pad that has a plurality of individual prongs. Generally, the container may be any shape that can be accommodate the agitator pad. In at least one embodiment, the container may be arcuate, with the ends of the arc connecting in a straight line, cylindrical, or rectangular prism. In various embodiments, the lid mirrors the container shape so that the lid and the container can be operatively connected. In various embodiments, the lid has a cover, so that when the device is not being use, the cover may be put in a closed position so that the cover closes the opening in the lid. Additionally, in further embodiments, the bottom of the container may have non-slip pads or other functional attachments so that when the device in on a surface, such as a bathroom counter, it cannot easily be moved.

In various embodiments, the device may have more than one compartment, such that the device can hold two or more toothbrushes. In multiple embodiments, when the device comprises two or more compartments, the compartments are fully separated from the other compartments, such that cleaning solution from one compartment cannot flow into another compartment. Additionally, in various embodiments, when the device comprises two or more separate compartments, each compartment has a separate opening in the lid of the device, such that if a device has four compartments, the lid may have four openings in the lid, each opening above one separate compartment.

In multiple embodiments, device includes an agitator pad having a plurality of individual prongs on the agitator pad that may be connected to the front side of the agitator pad, while the back side of the agitator pad is connected to the interior of the wall of the device container. Generally, the plurality of individual prongs of the agitator pad, in various embodiments, may be any shape and make any pattern or not have any pattern. In some embodiments, the plurality of individual prongs of the agitator pad may all be the same size. In an alternative embodiment, the plurality of individual prongs of the agitator pad may be two or more different sizes. Generally, the agitator pad may be any shape, but, preferably, generally the shape of the brush head to be cleaned. In various embodiments, the agitator pad is wider than the width of a typical toothbrush and taller than the height of a typical toothbrush head.

To use aspects of the present device, a user, in various embodiments, inserts a toothbrush head through an opening of the lid into the container filled with cleaning solution and rubs the bristles of the toothbrush against the individual prongs of the agitator pad to dislodge any deep-seated food particles, plaque residue, bacteria and/or other germs. The cleaning solution, in some embodiments, kills the bacteria and germs that become dislodged from the bristles. In at least one embodiment, the opening in the lid has apertures over the opening, substantially closing the opening, so that when the user is rubbing the bristles against the agitator pad, the cleaning solution cannot splash out of the container. In various embodiments, once the user is finished rubbing the bristles over the agitator pad, the user may leave the toothbrush head inside the device container filled with cleaning solution, so that no other germs may grow on any part of the toothbrush bristles or head. In some embodiments, the user may periodically drain the cleaning solution from the device container by removing the lid from the container and pouring the cleaning solution out. The user may then refill the container with new cleaning solution.

Exemplary Embodiments

Referring now to the figures, for the purposes of example and explanation of the fundamental processes and components of the disclosed devices, reference is made to FIG. 1, which illustrates a perspective view 100 of an exemplary brush cleaning device 102, according to one embodiment of the present disclosure. As will be understood and appreciated, the device 102 shown in FIG. 1 represents merely one approach or embodiment of the present device, and other aspects are used according to various embodiments of the present device. This disclosure generally places no limitations on the size or shape of the device 102 and the types of brushes that can be cleaned using the device. For example, the device 102 may clean multiple types of brushes, including but not limited to makeup brushes, hair brushes, paintbrushes, toothbrushes, and any other similar type brush.

In one exemplary embodiment, the device 102 may clean and store a toothbrush. For illustrative purposes only, the present disclosure shall describe the device 102 in the context of cleaning and holding a toothbrush. No limitations are intended based on the use of this discussion example, which is presented only for ease of illustration and discussion.

The device 102, in various embodiments, cleans the bristles of a brush by forcing the bristles apart and removing any deep-seated particles and residue, such as bacteria, dust, dirt, and other similar substances. Generally, the device 102 comprises an enclosed container 104 with an open top, a lid 106 for the container 104, an opening 108 in the lid through which a brush head can fit, and an agitator pad 112 located on a wall of the container 104, configured to dislodge deep-seated particles and residue, such as bacteria, dust, dirt, and other similar substances from brush bristles when a user rubs brush bristles over the agitator pad 112.

In various embodiments, the container 104 has an enclosed bottom portion and an open top portion, connected by a wall. In an exemplary embodiment, the container 104 may have one flat side wall 116 that is connected to an arcuate wall 118, wherein the two ends of the arcuate wall 188 connect to both ends of the flat wall 116. In various embodiments, the container 104 may be glass, plastic, metal, or any other similar material, as one with skill in the art would know.

The lid 106, in various embodiments, operatively connects to the container 104 by the side wall of the lid 106 fitting securely over the wall of the container 104. In alternative embodiments, the lid 106 may connect to the container 104 by screwing or snapping on, or some other known connection method. In various embodiments, a user may remove the lid 106 from the container 104. For example, a user may remove the lid 106 so that a cleaning solution may be drained from the container 104 and replaced. In multiple embodiments, the lid 106 has an opening 108 at or near the center of the lid 106. In various embodiments, the opening 108 may be configured so that a toothbrush head can fit through the opening 108 and into the container 104. The opening 108 may, in one embodiment, consist of a splashguard 109 so that the opening 108 is substantially closed. In one embodiment, the splashguard 109 may be made with a flexible material or rubber, so that a user can push a toothbrush head through the splashguard 109 and the opening 108, into the container 104. In a further embodiment, the splashguard 109 may comprise a plurality of apertures.

Figure 4:
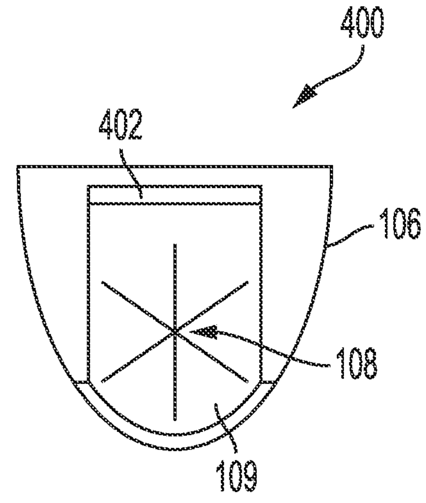
FIG. 4 is a top view of an exemplary toothbrush cleaning device, according to one embodiment of the present disclosure.

In various embodiments, the lid 106 may include a cover 110, having a top and bottom side, that is operatively connected to the lid 106 via a hinge 402 (see FIG. 4). In multiple embodiments, the cover 110 may have an open position, wherein the opening 108 is accessible, and a closed position, wherein the bottom side of the cover 110 covers the opening 108 so that a user cannot insert a toothbrush into the container 104 via the opening 108. In one embodiment, the lid 106 may have a cut-out 120 so that when the cover 110 is in the closed position, the cover 110 fits inside the cut-out 120 and the top side of the cover 110 is flush with the lid 106. The cover 110, in various embodiments, may securely attach to the lid 106 when in the closed position covering the opening 108, so that the top opening of the enclosed container 104 is effectively sealed. In alternative embodiments, the lid 106 may screw onto the sidewall of the container 104, or pop off of the sidewall of the container 104, or fit inside the sidewall of the container 104, where the lid 106 is a conical shape (i.e., wine bottle cork).

In various embodiments, an agitator pad 112 is affixed to the interior of the side wall of the container 104. The agitator pad 112, in multiple embodiments, comprises a plurality of individual prongs, so that when the toothbrush bristles contact the plurality of individual prongs, food particles and plaque residue dislodge from the toothbrush bristles. The agitator pad 112 has a front side and back side, wherein the plurality of individual prongs are connected to the front side of the pad and the back side of the pad is connected to the interior wall of the container 104. In various embodiments, depending on the use case, the agitator pad 112 may be made of plastic, rubber, metal, or some other similar rigid or semi-rigid material as one with skill in the art would know. For example, in at least one embodiment, a brush having thick, more inflexible bristles may require the plurality of prongs on the agitator pad 112 to be made from a more rigid material (such as hard plastic or metal) to facilitate the cleaning of the bristles. In one embodiment, the plurality of individual prongs of the agitator pad 112 may be different sizes, so the toothbrush bristles rub at different points on the bristles and the food particles and other debris fall through the individual prongs to the bottom of the container 104. For example, in the exemplary embodiment in FIG. 1, the agitator pad 112 has two sizes of individual prongs, though it will be understood that the agitator pad 112 can also have more or less than two sizes of individual prongs, depending on designer or user preferences. In one embodiment, the plurality of individual prongs of agitator pad 112 are conical-shaped, which is advantageous because food particles are less likely to get stuck in conically-shaped prongs. Generally, the plurality of individual prongs of agitator pad 112 may be any shape. Generally, plurality of individual prongs on agitator pad 112 may be in any pattern or randomly placed. In multiple embodiments, the width of the agitator pad 112 may be wider than the width of a typical toothbrush head. In various embodiments, the height of the agitator pad 112 may be taller than the height of a typical toothbrush head.

In multiple embodiments, the exterior of the bottom of the container 104 may have one or more nonslip bases 114 affixed so that the device 102 does not slip while on a surface. In various embodiments, the one or more nonslip bases 114 may be made of rubber or cork or some other non-slip material. In at least one embodiment, the one or more nonslip bases 114 may be a pad across the whole bottom of the container 104. In one or more embodiments, the one or more nonslip bases 114 may be around the rim of the bottom of the container 104. In one embodiment, the one or more nonslip bases 114 may be made of a magnetized metal. In another embodiment, the one or more nonslip bases 114 may be a suction-cup device so that the device 102 is suctioned onto a surface when the suction-cup pads 114 are applied to the surface.

Figure 2:
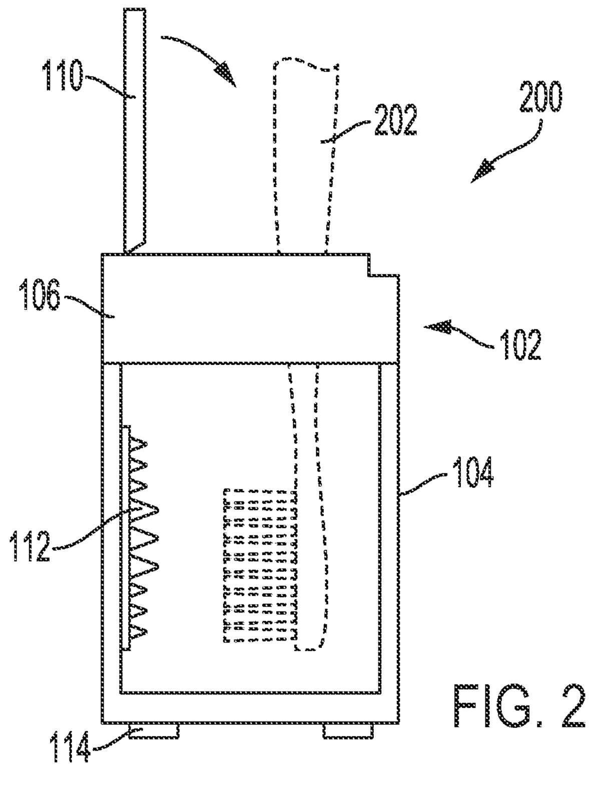
FIG. 2 is a side view of an exemplary toothbrush cleaning device, according to one embodiment of the present disclosure.

Now referring to FIG. 2, a side view 200 of the exemplary toothbrush cleaning device 102 is shown according to one embodiment of the disclosure. As shown, in various embodiments, a toothbrush 202 is inside the container 104 via the opening 108 (not shown). In multiple embodiments, the toothbrush 202 may be inserted into the container 104 with the bristles facing the agitator pad 112. FIG. 2 shows the cover 110 in the open position, allowing the toothbrush 202 to breach the opening 108 and enter the container 104.

In various embodiments, the agitator pad 112, as shown in FIG. 2, may be organized in such a way that the plurality of individual prongs are in rows across the width of the agitator pad 112.

Figure 3:
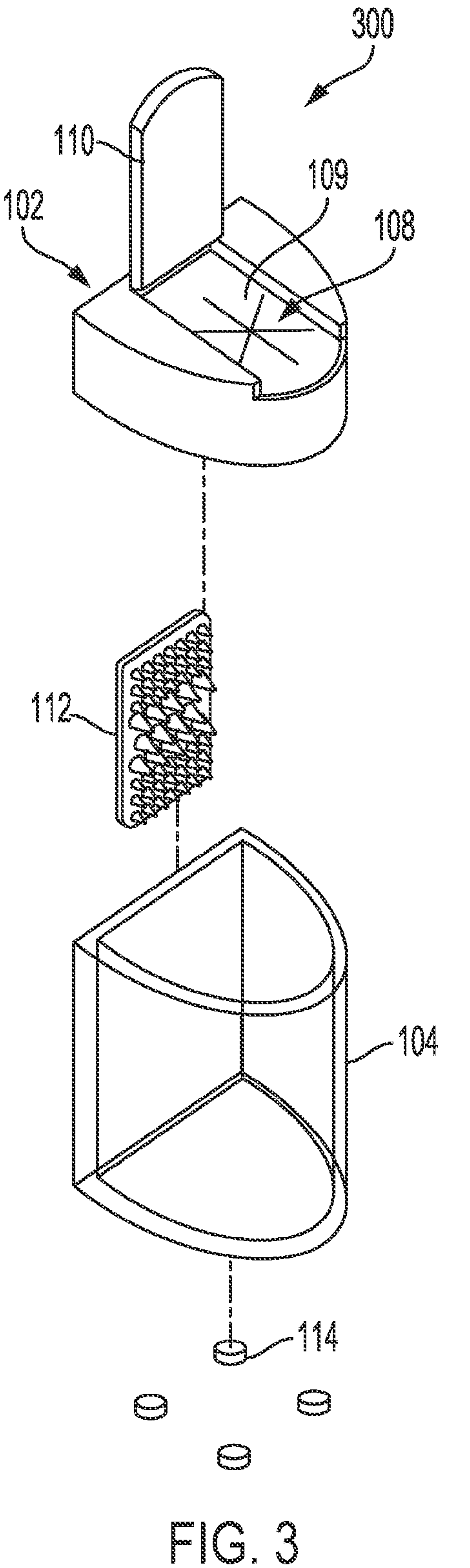
FIG. 3 is an exploded view of an exemplary toothbrush cleaning device, according to one embodiment of the present disclosure.

FIG. 3 shows an exploded view 300 of an exemplary toothbrush cleaning device 102, according to one embodiment of the present disclosure.

Figure 5A:
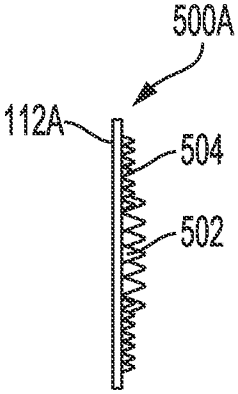
FIG. 5A is a side view of an exemplary toothbrush cleaning device agitator surface, according to one embodiment of the present disclosure.

Turning to FIG. 4, a top view 400 of an exemplary toothbrush cleaning device 102, according to one embodiment of the present disclosure, is shown. As shown, the lid 106, in one embodiment, is an arcuate shape with the ends of the arcuate shape connected by a straight line. In various embodiments, the lid 106 consists of the opening 108 and the splashguard 109 and the cover 110 (not shown) connected to the lid 106 via the hinge 402. As shown in FIG. 4, the splashguard 109, in one embodiment, substantially cover the opening 108. Also shown in FIG. 4, in some embodiments, the lid 106 may have a cut-out 120 so that when the cover 110 is in the closed position, the cover 110 fits into the cut-out 120 and the splashguard 109 and the opening 108 are covered by the cover 110. In various embodiments, when the user is actively using the device 102 to clean a toothbrush, the splashguard 109 keeps the cleaning solution from splashing out of the opening 108. In one embodiment, the splashguard 109 may be a plurality of apertures (as shown in FIG. 4). In an alternate embodiment, the splashguard 109 may be a single slit in a flexible material that substantially covers the opening 108. Now referencing FIG. 5A, a side view 500A is shown of an exemplary toothbrush cleaning device agitator pad 112A, according to one embodiment of the present disclosure. In one embodiment, the agitator pad 112A comprises a plurality of individual prongs 502, 504 having two distinct sizes. Although FIG. 5A shows the larger individual prongs 502 in the middle of the agitator pad 112A and the smaller individual prongs 504 closer to the top and bottom ends of the agitator pad 112A, it should be understood that the individual prongs 502, 504 could be configured to be in any pattern or design, or not be placed in any particular pattern, depending on the functional goals of the designer.

Figure 5B:
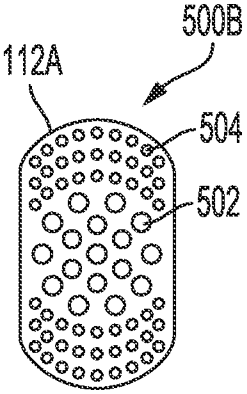
FIG. 5B is a front view of an exemplary toothbrush cleaning device agitator surface, according to one embodiment of the present disclosure.

Turning to FIG. 5B, a front view 500B is shown of an exemplary toothbrush cleaning device agitator pad 112A, according to one embodiment of the present disclosure. As shown in FIG. 5B, it will be appreciated that the circles shown represent the conical individual prongs as shown in FIG. 5A, where the bigger circles represent the larger individual prongs 502 and the smaller circles represent the smaller individual prongs 504. In various embodiments, the agitator pad 112A may be a generally rectangular shape with rounded top and bottom ends. However, the shape of agitator pad 112 should not be construed as limited to the shape as shown in FIG. 5B by agitator pad 112A, as the shape of the agitator pad 112 may depend on the functional goals of the designer. In various embodiments, the agitator pad 112A may have a pattern in which one or more rows of small individual prongs 504 are arced over and below a centrally-grouped plurality of larger individual prongs 502.

Figure 5C:
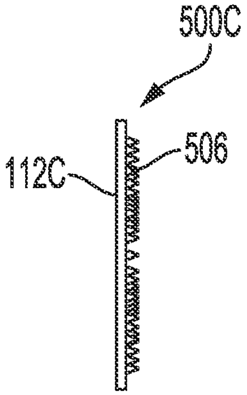
FIG. 5C is a side view of an alternative exemplary toothbrush cleaning device agitator surface, according to one embodiment of the present disclosure.

Now referring to FIG. 5C, a side view 500C of an alternative exemplary toothbrush cleaning device agitator pad 112C is shown, according to one embodiment of the present disclosure. As shown in FIG. 5C, the plurality of individual prongs 506 on the agitator pad 112C are the same size.

Figure 5D:
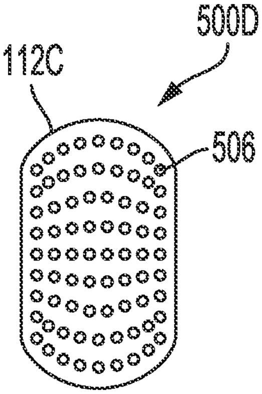
FIG. 5D is a front view of an alternative exemplary toothbrush cleaning device agitator surface, according to one embodiment of the present disclosure.

Now referring to FIG. 5D, a front view 500D of an alternative exemplary toothbrush cleaning device agitator pad 112C is shown, according to one embodiment of the present disclosure. In various embodiments, the plurality of prongs 506 on the agitator pad 112C may be placed in rows, wherein the agitator pad 112C has a middle row of individual prongs that is substantially straight, and rows of individual prongs above and below the middle row of individual prongs that are increasingly arcuate in nature, where the rows of individual prongs closer to the middle row have a lesser arc angle than the rows near the top and bottom of agitator pad 112C.

Figure 5E:
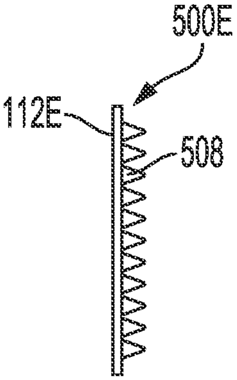
FIG. 5E is a side view of an alternative exemplary toothbrush cleaning device agitator surface, according to one embodiment of the present disclosure.

Turning to FIG. 5E, a side view 500E of an alternative exemplary toothbrush cleaning device agitator pad 112E is shown, according to one embodiment of the present disclosure. As shown, the plurality of individual prongs 508 of the agitator pad 112E are larger individual prongs relative to the plurality of individual prongs 506 on agitator pad 112C (as shown in FIG. 5D). In various embodiments, the agitator pad 112E may have a plurality of individual prongs 508 in organized rows or in organized columns, or may be in some other pattern or not have a pattern at all, which may depend on the functional goals of the designer.

Figure 5F:
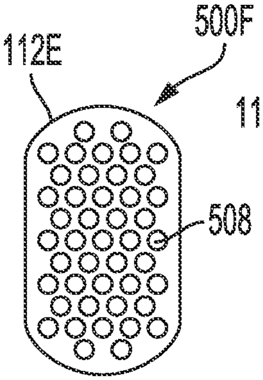
FIG. 5F is a front view of an alternative exemplary toothbrush cleaning device agitator surface, according to one embodiment of the present disclosure.

Turning now to FIG. 5F, a front view 500F of an alternative exemplary toothbrush cleaning device agitator pad 112E is shown, according to one embodiment of the present disclosure. As shown in FIG. 5F, in one embodiment, the plurality of individual prongs 508 of the agitator pad 112 may be aligned so that each column of individual prongs includes an individual prong from every second row. For example, as shown in FIG. 5F, in various embodiments, the first column of prongs (from the top of the agitator pad 112E to the bottom of the agitator pad 112E) has an individual prong from the second row, fourth row, sixth row, eighth row, and tenth row of individual prongs.

Figure 5G:
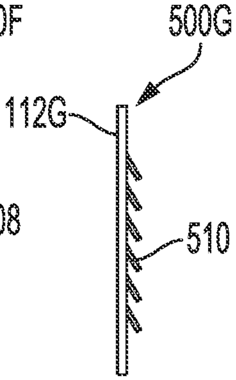
FIG. 5G is a side view of an alternative exemplary toothbrush cleaning device agitator surface, according to one embodiment of the present disclosure.

Now referring to FIG. 5G, a side view 500G of an alternative exemplary toothbrush cleaning device agitator pad 112G is shown, according to one embodiment of the present disclosure. As shown in FIG. 5G, in one embodiment, the plurality of individual prongs 510 of agitator pad 112G are configured at a downward angle relative to the front of the pad of the agitator 112G. In one embodiment, the plurality of individual prongs 510 of the agitator 112G may be at an angle between 0 and 90 degrees relative to the front of the agitator pad 112G so that when the toothbrush bristles of a toothbrush are rubbed against the plurality of individual prongs 510 of agitator pad 112G, the toothbrush bristles catch underneath the plurality of individual prongs 510 of the agitator pad 112G and are bent as the toothbrush is pulled up from the bottom to the top of the agitator pad 112G.

Figure 5H:
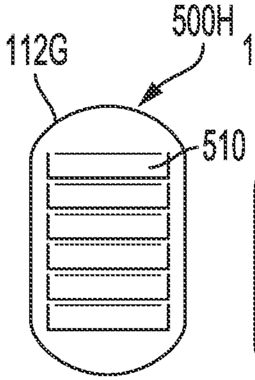
FIG. 5H is a front view of an alternative exemplary toothbrush cleaning device agitator surface, according to one embodiment of the present disclosure.

Turning to FIG. 5H, a front view 500H of an alternative exemplary toothbrush cleaning device agitator pad 112G is shown, according to one embodiment of the present disclosure. As shown in FIG. 5H, in one embodiment, the plurality individual prongs 510 of agitator pad 112G may be rectangular-shaped across the width of the agitator pad 112G so that a row consists of a single individual prong of the agitator pad 112G.

Figure 5I:
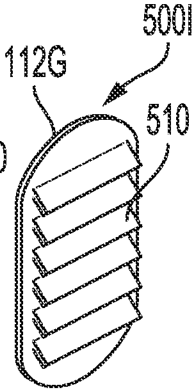
FIG. 5I is a perspective view of an alternative exemplary toothbrush cleaning device agitator surface, according to one embodiment of the present disclosure.

Turning to FIG. 5I, a perspective view 500I of an alternative exemplary toothbrush cleaning device agitator pad 112G is shown, according to one embodiment of the present disclosure.

Figure 6A:
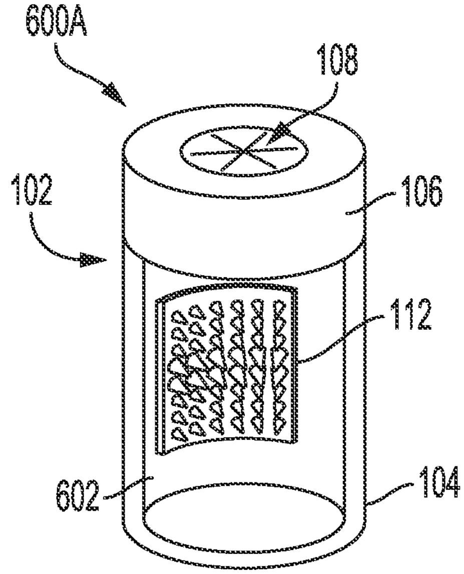
FIG. 6A is a perspective view of an alternative exemplary toothbrush cleaning device, according to one embodiment of the present disclosure.

Now referring to FIG. 6A, a perspective view 600A of an alternative exemplary toothbrush cleaning device 102 is shown, according to one embodiment of the present disclosure. As shown, in one embodiment, the container 104 has a circular-shaped bottom and top, creating a cylindrical shape, and the lid 106 has a circular bottom and top, wherein the container 104 and the lid 106 may be operatively connected. In one embodiment, the agitator pad 112 is connected to the circular-shaped wall 602 of the container 104 so that the agitator pad 112 is configured in an arcuate-shape. As a result, in one embodiment, the individual prongs of the agitator pad 112 point inward at an angle so that each individual prong on a given row is pointing substantially to the same axial center point of the container 104. Additionally, as shown, in one embodiment, the lid 106 may not have a cover 110 to cover the opening 108.

Figure 6B:
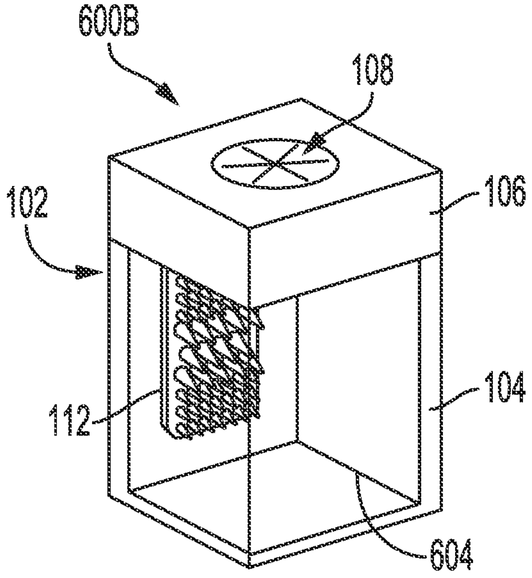
FIG. 6B is a perspective view of an alternative exemplary toothbrush cleaning device, according to one embodiment of the present disclosure.

Turning to FIG. 6B, a perspective view 600B of an alternative exemplary toothbrush cleaning device 102 is shown, according to one embodiment of the present disclosure. In various embodiments, the container 104 may have a quadrilateral-shaped bottom and top connected by four quadrilateral-shaped walls 604. In some embodiments, the lid 106 may have a quadrilateral-shape that matches the shape of the container 104 so that the lid 106 and the container 104 may operatively connect. In various embodiments, the shape of the container 104 enable different functionality, including but not limited to ease of use, ease of manufacturing, and aesthetic appeal, etc.

Figure 7:
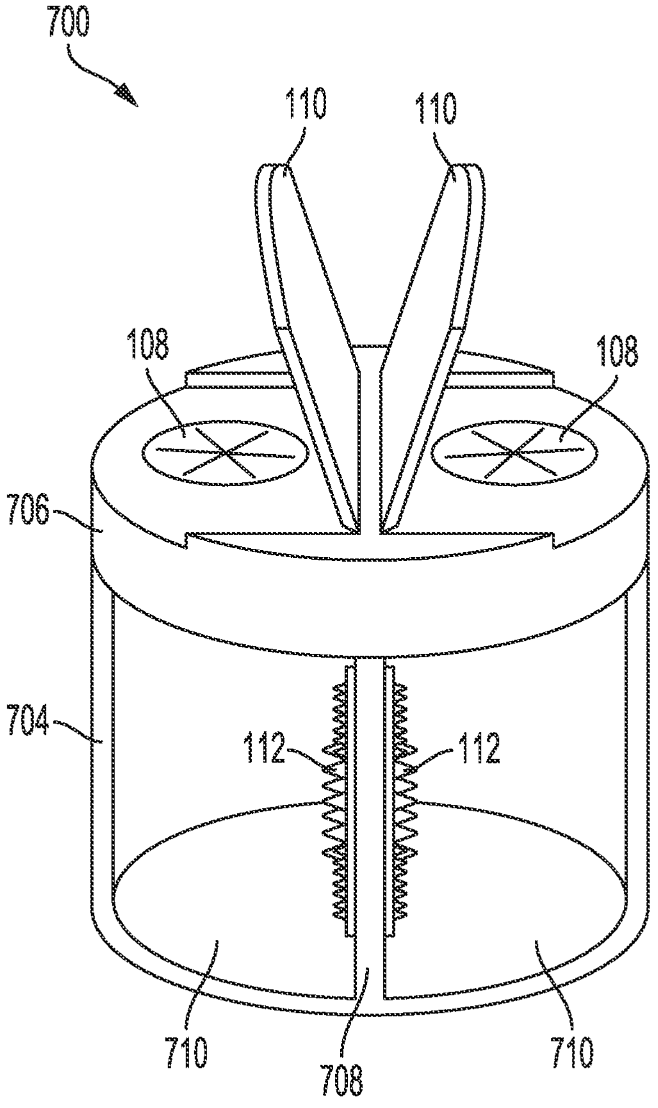
FIG. 7 is a perspective view of an alternative exemplary toothbrush cleaning device, according to one embodiment of the present disclosure.

Now turning to FIG. 7, a perspective view 700 of an alternative exemplary toothbrush cleaning device 102 is shown, according to one embodiment of the present disclosure. In various embodiments, the toothbrush cleaning device 102 may be configured to hold two toothbrushes in separate compartments. As shown in FIG. 7, the toothbrush cleaning device 102, in multiple embodiments, may consist of a container 704 and a lid 706, wherein the two separate compartments are separated by dividing wall 708. In various embodiments, the container 704 may have a bottom shaped as an oval, side walls arising from the oval-shaped bottom, and an open top shaped like an oval. In multiple embodiments, the lid 706 may have a top side that is oval-shaped and side walls going straight down from the top side, wherein the side walls fit around the side walls of the container 704 so that the lid 706 and the container 704 are operatively connected but may be disconnected from one another. The dividing wall 708, in various embodiments, is located substantially in the center of the container 704 so that the dividing wall 708 creates two separate compartments 710. In multiple embodiments, the dividing wall 708 extends upwards to the bottom side of the lid 706 so that any liquid inside the two separate compartments cannot flow from one compartment 710 to the other compartment 710.

In various embodiments, the lid 706 has two openings 108, one opening above each compartment 710. In some embodiments, the lid 706 may have covers 110 that cover each opening 108. In multiple embodiments, both sides of the dividing wall 708 are connected to an agitator pad 112 so that each compartment 710 has an agitator pad 112.

Figure 8:
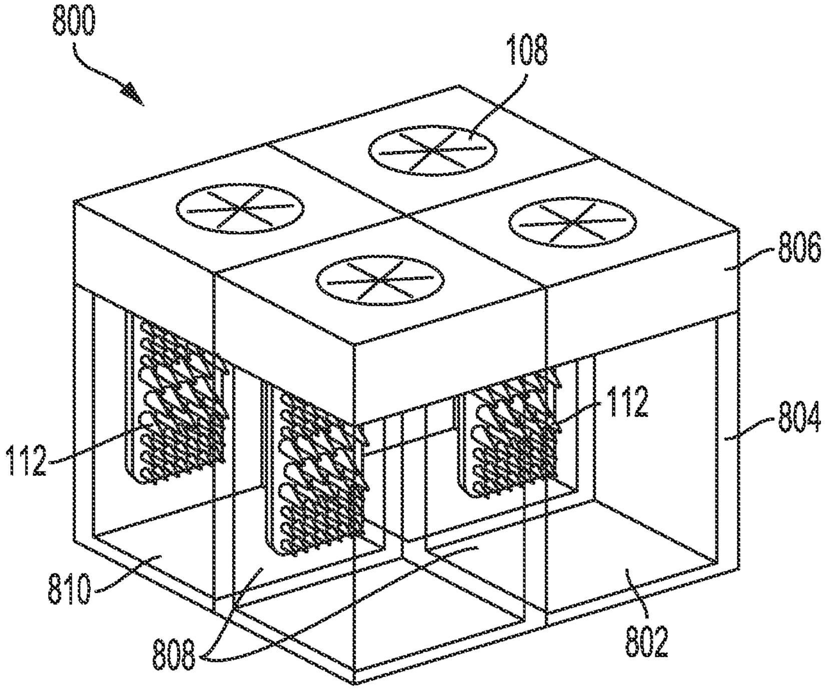
FIG. 8 is a perspective view of an alternative exemplary toothbrush cleaning device, according to one embodiment of the present disclosure.

Now referring to FIG. 8, a perspective view 800 of an alternative exemplary toothbrush cleaning device 112 is shown, according to one embodiment of the present disclosure. As shown, in various embodiments, the toothbrush cleaning device 102 is comprised of the container 804 having a substantially quadrilateral-shaped bottom with side walls 802 extending up from the bottom, creating a quadrilateral-shaped top opening, and a lid 806 having a substantially quadrilateral-shaped top side and bottom side with side walls extending down, and internal dividing walls 808, creating four separate compartments 810, each compartment 810 separated by the internal dividing walls 808. In multiple embodiments, the internal dividing walls 808 extend to the bottom side of the lid 806 so that liquid in one compartment 810 cannot flow to any other compartment 810. In multiple embodiments, the lid 806 has four openings 108 so that each compartment 810 has a separate opening 108. In various embodiments, each compartment has an agitator pad 112.

Figures 9A, 9B, 9C:
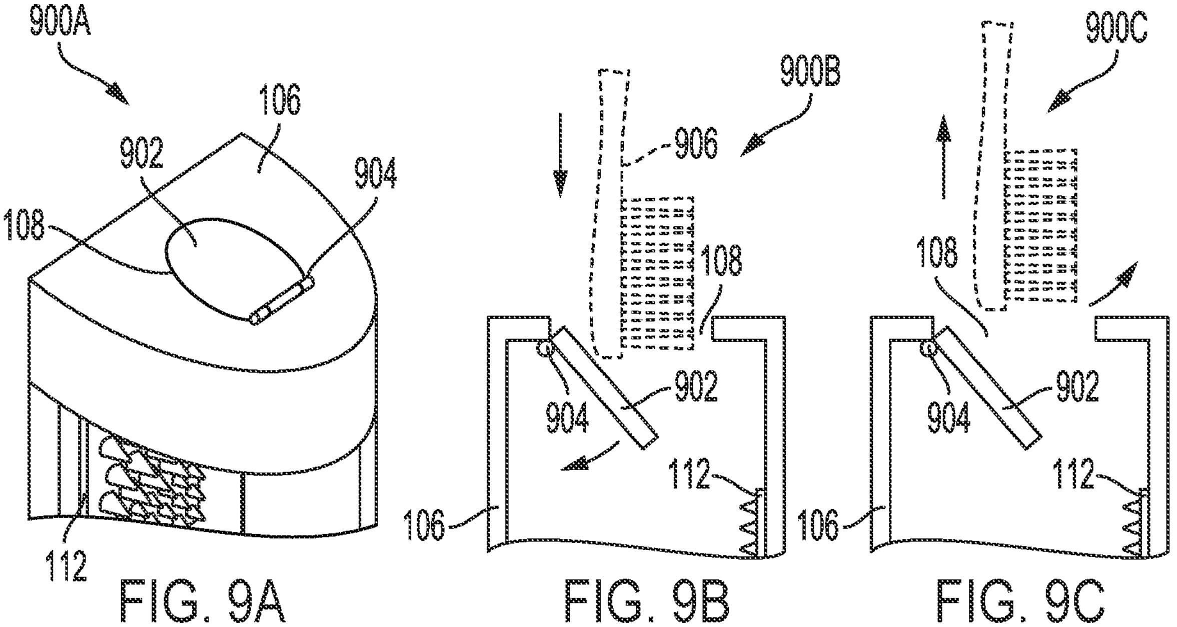
FIG. 9A is a perspective view of an alternative top opening for an exemplary toothbrush cleaning device, according to one embodiment of the present disclosure.
FIG. 9B is a side view of an alternative top opening for an exemplary toothbrush cleaning device, according to one embodiment of the present disclosure.
FIG. 9C is a side view of an alternative top opening for an exemplary toothbrush cleaning device, according to one embodiment of the present disclosure.

Turning to FIG. 9A-C, a perspective view 900A, a side view 900B, and a side view 900C of an alternative top opening for an exemplary toothbrush cleaning device 102 are shown, according to one embodiment of the present disclosure. As shown in FIG. 9A, in one embodiment, the lid 106 with the opening 108 may have a cap 902 with a hinge 904 covering the opening 108. In one embodiment, the hinge 904 may be spring-loaded. In various embodiments, the hinge 904 may be on the opposite side of the device 102 from the agitator pad 112, so that when a user presses a toothbrush head onto cap 902, the toothbrush bristles are facing the agitator pad 112. As shown in FIG. 9B, when a user pushes a toothbrush 906 down onto the cap 902, in multiple embodiments, the cap 902 swings down on the hinge 904, opening to allow the toothbrush 906 into the container 104 through the opening 108. As shown in FIG.

9C, when a user pulls a toothbrush 906 out of the container 104, the cap 902 rotates around the hinge 904 to close the opening 108.

Figure 10:
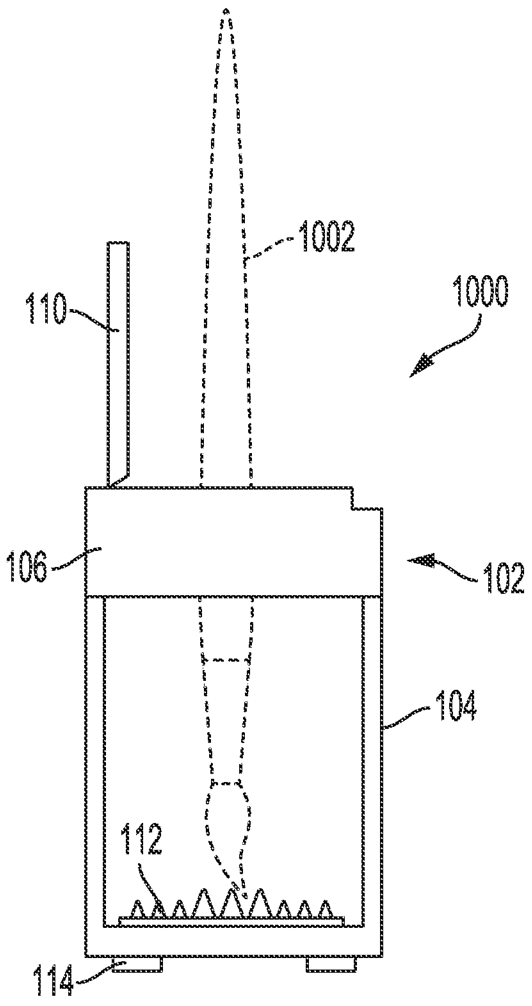
FIG. 10 is a side view of an alternative exemplary brush cleaning device, according to one embodiment of the present disclosure.

Now referring to FIG. 10, a side view 1000 of an alternative brush cleaning device 102 is shown according to one embodiment of the disclosure. As shown, in various embodiments, a paintbrush 1002 is inside the container 104 via the opening 108 (not shown). In multiple embodiments, the agitator pad 112 is affixed to the interior of the bottom of the container 104. In at least one embodiment, the agitator pad 112 is configured to cover a substantial portion of the surface of the interior of the bottom of the container 104. In some embodiments, the agitator pad 112 may have a similar shape as the shape of the interior surface of the bottom of the container 104. In another embodiment, the agitator pad 112 may not be the same shape as the interior surface of the bottom of the container 104, but the agitator pad 112 will fit into the area provided by the interior of the bottom of the container 104. In various embodiments, the agitator pad 112 may have any pattern of individual prongs as discussed herein. FIG. 10 shows the cover 110 in the open position, allowing the paintbrush 1002 to breach the opening 108 and enter the container 104. In other embodiments, the paintbrush 1002 may be a makeup brush or any other brush which has bristles that extend outwardly parallel from the brush body.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A device configured to clean a toothbrush, comprising:

a container for receiving a head of the toothbrush, comprising:

a bottom; and at least one sidewall, wherein an upper portion of the at least one sidewall defines an opening for receiving the head of the toothbrush; and an agitator pad affixed to an interior portion of the at least one sidewall of the container and configured to clean the head of the toothbrush, wherein the agitator pad comprises a plurality of individual prongs, wherein the plurality of individual prongs extend inwardly from the agitator pad into the container, and wherein the plurality of individual prongs comprise at least two different lengths configured to clean toothbrush bristles and the head of the toothbrush.

2. The device of claim 1, further comprising a lid releasably affixed to the opening, thereby further defining a lid opening in the lid.

3. The device of claim 2, further comprising a splashguard that substantially covers the lid opening and is configured to allow the insertion of the toothbrush therethrough and to prevent a fluid from escaping the container.

4. The device of claim 3, wherein the splashguard comprises a plurality of apertures, the plurality of apertures comprising flexible portions.

5. The device of claim 3, wherein the splashguard is operatively connected to the lid by a spring-loaded hinge.

6. The device of claim 1, further comprising at least one nonslip base affixed to an exterior portion of the bottom of the container.

7. The device of claim 6, wherein the at least one nonslip base is made of at least one of the following: rubber, cork, wood, felt, magnetized metal, suction cup.

8. The device of claim 1, wherein the container is configured be filled with sterilizing solution.

9. The device of claim 1, wherein the plurality of individual prongs comprise at least one of the following shapes: cone, cylinder, rectangular prism.

10. The device of claim 1, wherein the plurality of individual prongs are ordered in a pattern.

11. The device of claim 1, wherein the bottom comprises one of the following shapes:

a circle, an oval, a square, a rectangle, or a parabolic segment; and wherein the at least one sidewall extends upwards.

12. A container configured to clean a toothbrush, comprising:

a bottom;

at least one sidewall, wherein an upper portion of the at least one sidewall defines an opening for receiving a head of the toothbrush;

a splashguard that substantially covers the opening and is configured to allow the insertion of the head of the toothbrush therethrough and to prevent a fluid from escaping the container; and an agitator pad affixed to an interior portion of the at least one sidewall and configured to clean the head of the toothbrush, wherein the agitator pad comprises a plurality of individual prongs, wherein the plurality of individual prongs extend inwardly from the agitator pad into the container.

13. The container of claim 12, wherein the plurality of individual prongs comprise at least two different lengths configured to clean toothbrush bristles and the head of the toothbrush.

14. The container of claim 12, wherein the splashguard comprises a plurality of apertures, the plurality of apertures comprising flexible portions.

15. The container of claim 12, wherein the splashguard is operatively connected to the lid by a spring-loaded hinge.

16. The container of claim 12, further comprising at least one nonslip base affixed to an exterior portion of the bottom of the container.

17. The container of claim 16, wherein the at least one nonslip base is made of at least one of the following: rubber, cork, wood, felt, magnetized metal, suction cup.

18. The container of claim 12, wherein the plurality of individual prongs are ordered in a pattern.

19. The container of claim 12, wherein the plurality of individual prongs comprise at least one of the following shapes: cone, cylinder, rectangular prism.

20. The container of claim 12, wherein the bottom comprises one of the following shapes: a circle, an oval, a square, a rectangle, or a parabolic segment; and wherein the at least one sidewall extends upwards.

* * * * *